US008090957B2

(12) United States Patent
Matsuzaki et al.

(10) Patent No.: US 8,090,957 B2
(45) Date of Patent: Jan. 3, 2012

(54) INFORMATION SECURITY DEVICE, INFORMATION SECURITY METHOD, COMPUTER PROGRAM, COMPUTER-READABLE RECORDING MEDIUM, AND INTEGRATED CIRCUIT

(75) Inventors: Natsume Matsuzaki, Osaka (JP); Yuichi Futa, Osaka (JP)

(73) Assignee: Panasonic Corporation, Osaka (JP)

( * ) Notice: Subject to any disclaimer, the term of this patent is extended or adjusted under 35 U.S.C. 154(b) by 953 days.

(21) Appl. No.: 12/088,028

(22) PCT Filed: Oct. 18, 2006

(86) PCT No.: PCT/JP2006/320715
§ 371 (c)(1),
(2), (4) Date: Mar. 25, 2008

(87) PCT Pub. No.: WO2007/046402
PCT Pub. Date: Apr. 26, 2007

(65) Prior Publication Data
US 2010/0064142 A1    Mar. 11, 2010

(30) Foreign Application Priority Data
Oct. 19, 2005   (JP) .................................. 2005-304169

(51) Int. Cl.
*H04L 29/06*    (2006.01)
(52) U.S. Cl. ...................................................... 713/189
(58) Field of Classification Search .................... 713/189
See application file for complete search history.

(56) References Cited

U.S. PATENT DOCUMENTS

| 5,724,279 | A | * | 3/1998 | Benaloh et al. | 708/491 |
| 5,742,530 | A | * | 4/1998 | Gressel et al. | 708/491 |
| 5,745,398 | A | * | 4/1998 | Monier | 708/492 |
| 6,408,075 | B1 | | 6/2002 | Ohki et al. | |
| 6,968,354 | B2 | | 11/2005 | Kaminaga et al. | |
| 2002/0152252 | A1 | * | 10/2002 | Kaminaga et al. | 708/491 |
| 2005/0105723 | A1 | * | 5/2005 | Dupaquis et al. | 380/59 |
| 2006/0010192 | A1 | * | 1/2006 | Fischer et al. | 708/620 |
| 2006/0064453 | A1 | * | 3/2006 | Fischer et al. | 708/620 |
| 2007/0064930 | A1 | * | 3/2007 | Fischer | 380/28 |

FOREIGN PATENT DOCUMENTS

| JP | 2000-165375 | 6/2000 |
| JP | 2002-258743 | 9/2002 |

OTHER PUBLICATIONS

International Search Report issued Feb. 13, 2007 in the International (PCT) Application of which the present application is the U.S. National Stage.

(Continued)

*Primary Examiner* — Michael S McNally
(74) *Attorney, Agent, or Firm* — Wenderoth, Lind & Ponack, L.L.P.

(57) ABSTRACT

The present invention aims to provide an information security apparatus that counters a simple power analysis attack (SPA) on an information security apparatus such as an RSA cryptosystem. The information security apparatus uses a multiplication with 1 in a Montgomery domain. 1 in the Montgomery domain is determined depending on a modulus and an integer k, which is greater than a number of bits of a modulus p. Therefore, it is hard for attackers who do not know p or k to analyze. Also, even if an analyzer can predict the Hamming weight, it is possible to further improve the safety against the SPA by modifying k or the modulus at random.

16 Claims, 6 Drawing Sheets

OTHER PUBLICATIONS

Handbook of Applied Cryptography, CRC Press, pp. 613-616 and 620-621, 1997.

Sakai et al., "The Actual Threat Side Channel Analysis" (Part 1), Nikkei Electronics, pp. 141-143, Jul. 2005 (with English translation).

Sakai et al., "The Actual Threat Side Channel Analysis" (Part 2), Nikkei Electronics, pp. 125-131, Aug. 2005 (with English translation).

Sakai et al., "The Actual Threat Side Channel Analysis" (Final), Nikkei Electronics, pp. 131-139, Aug. 2005 (with English translation).

Kaminaga et al., "Power Analysis and Countermeasure of RSA Cryptosystem", *Journal A of the Institute of Electronics,* Information and Communication Engineers, vol. J88-A, No. 5, pp. 606-615 (with English translation).

Montgomery, "Modular Multiplication Without Trial Division", *Mathematics of Computation,* vol. 44, No. 170, pp. 519-521, 1985.

Kaminaga et al., "Theory and Technology of Information Security: From Cryptographic Theory to Tamper Resistant Technology of IC Card", pp. 170-185, 2005 (with partial English translation).

\* cited by examiner

INFORMATION SECURITY DEVICE, INFORMATION SECURITY METHOD, COMPUTER PROGRAM, COMPUTER-READABLE RECORDING MEDIUM, AND INTEGRATED CIRCUIT

TECHNICAL FIELD

The present invention relates to tamper resistant technology used for an information security apparatus that performs public key cryptosystem processing and signature processing using a private key.

BACKGROUND ART

In recent years, as information and communication technologies have become widespread, the importance of information security technologies has been increasing more than ever. Cryptographic techniques are used, as one of these information security technologies, for protecting privacy and confirming communication partners.

However, when attempting to protect something using cryptographic techniques, those who try to break and obtain an encryption appear. For example, a side channel attack that obtains a private key, taking advantage of the fact that time taken for calculation and power consumption in cryptographic process varies in accordance with the value of the private key, is problematic (e.g. Non-Patent Document 1).

A typical side channel attack is a simple power analysis attack (SPA) against the RSA cryptographic scheme (more accurately, an RSA signature using the private key) and against the decryption process of the RSA cryptographic scheme. A main process of the RSA cryptographic scheme is an exponentiation with the private key being an exponent. The exponentiation is realized by repetition of squarings and multiplications. In this case, the multiplication is not performed when a corresponding bit of the private key is "0" and the multiplication is performed only when the corresponding bit of the private key is "1". Therefore, the SPA obtains the private key from sequence information of the multiplications and squarings which is obtained by waveform judgment of the power consumption.

The SPA may be countered by performing the multiplication even when the bit of the private key is "0". Two specific conventional methods are described in the following.

In the first method, when the bit of the private key is "0", "1" is multiplied (e.g. Non-Patent Document 2). Multiplying "1" does not change the result. Therefore, this is the same as not actually performing the multiplication. Furthermore, since the multiplication is performed without depending on the bit value of the private key, the private key cannot be obtained by whether the multiplication is performed or not.

Also, in the second method that counters SPA, the multiplication is performed first, regardless of whether the bit is "0" or "1". Control is performed such that the result of the multiplication is used only when the bit is "1", and the result of the multiplication is not used when the bit is "0" (e.g. Patent Document 1 and 2). In this method also, the multiplication is performed without depending on the bit value. Therefore, the private key cannot be obtained by whether the multiplication is performed or not.

Non-Patent Document: The actual threat "Side Channel Analysis" (1), Nikkei Electronics 2005.7. Vol. 18

Non-Patent Document 2: "Power Analysis and Countermeasure of RSA Cryptosystem", Journal A of the Institute of Electronics, Information and Communication Engineers Vol. J88-A, No. 5 2005

Non-Patent Document 3: P. L. Montgomery, "Modular Multiplication without Trial Division," Mathematics of Computation, Vol. 44, No. 170, pp. 519-521 (1985)

Patent Document 1: Japanese Laid-open Publication No. 2000-165375

Patent Document 2: U.S. Pat. No. 6,408,075

SUMMARY OF THE INVENTION

Problems to be Solved by the Invention

However, according to the first method that counters the SPA, one of inputs to be multiplied is "1" that has a bias towards hamming weight, which affects power variations and enables it to be distinguished whether 1 is multiplied. As a result, the private key can possibly be analyzed illegitimately.

Also, according to the second method, it is possible that the bit of the private key is analyzed during the multiplication by, for example, an error attack that gives supply voltage a spike noise and the like that generate errors intentionally. In more detail, the error is generated intentionally in multiplying, and if the effect of the error is not apparent in the output, this means that the result of the multiplication is not used, in other words, the bit of the private key was "0". On the other hand, if the effect of the error is apparent in the output, it is possible to analyze that the bit corresponding to the private key has been "1". This analysis is possible even if a proof, which is a usual countermeasure against the error attack, is introduced.

The present invention has an object of providing an information security apparatus, an information security method, a computer program, a recording medium and an integrated circuit that solve the above problem and can counter SPA in using the first method. Also, since the present invention is based on the first method, the attack by the second method is meaningless.

Means to Solve Problems

To achieve the above object, the present invention is an information security apparatus for processing an input value securely and reliably by operating a modular exponentiation that raises the input value to a power of an integer over a predetermined modulus, the modular exponentiation being composed of repeated multiplications of each digit of the integer so as to obtain an exponential value, the information security apparatus comprising a judgment unit operable to judge whether a value of a digit of the integer is 0 or not and a multiplication unit operable, when the value of the digit is judged to be 0, to operate a modular multiplication using a Montgomery transform value of a value 1.

Effects of Invention

According to this structure, since the modular multiplication uses "1", which has been transformed into the Montgomery transform value, the use of "1", which has the bias towards the hamming weight, can be avoided. Thus, it is possible to make it hard to analyze illegitimately, countering the SPA.

Here, the information security apparatus may be one of (i) an RSA decryption device that decrypts RSA ciphertext based on an RSA scheme and (ii) an RSA signature device that generates signature data for a message to be signed based on the RSA scheme and may further comprise an acquisition unit operable to acquire, as the input value, the RSA ciphertext or the message, a storage unit that stores the integer as a private key and an output unit operable to output the obtained exponential value as one of a decryption text obtained by decrypting the RSA ciphertext and the signature data generated for the message.

According to this structure, in RSA decryption that decrypts the RSA ciphertext based on the RSA scheme and also in RSA signature that generates the signature data for the message to be signed based on the RSA scheme, the use of "1" that has the bias towards the hamming weight can be avoided, which enables to make it hard to analyze illegitimately, countering the SPA.

Here, the information security apparatus may further comprise an acquisition unit operable to acquire the input value, a storage unit that stores the integer, an initializing unit operable to store an initial value in an operational variable for storing a value of a calculation result, an extraction unit operable to extract a value of a digit starting from a highest order digit of the integer from the storage unit, a squaring unit operable to overwrite the operational variable with a value obtained according to at least one modular squaring of a value stored in the operational variable, the judgment unit operable to judge whether the value of the obtained digit is 0 or not, the multiplication unit operable, (i) when the value of the obtained digit is judged to be 0, to overwrite the operational variable with a value obtained according to modular multiplication of the value stored in the operational variable by the Montgomery transform value of the value 1 and (ii) when the value of the obtained digit is judged to be a value other than 0, to overwrite the operational variable with a value obtained according to modular multiplication of the value stored in the operational variable by a value determined by the input value, a repeat control unit operable to control the extraction unit, the squaring unit, the judgment unit and the multiplication unit to repeat the acquisition of the value, the modular squarings, the judgment, and the modular multiplications respectively, for every digit of the integer and an output unit operable, when repetition for each digit of the integer has been completed, to output a value according to the value stored in the operational variable.

Also, the information security apparatus may further comprise an acquisition unit operable to obtain and store the input value in an input variable, a storage unit that stores the integer, an initializing unit operable to store an initial value in an operational variable for storing a value of a calculation result, an extraction unit operable to extract a value of a digit starting from a lowest order digit of the integer from the storage unit, a squaring unit operable to overwrite the input variable with a value obtained according to at least one modular squaring of a value stored in the input variable, the judgment unit operable to judge whether the value of the obtained digit is 0 or not, the multiplication unit operable, (i) when the value of the obtained digit is judged to be 0, to overwrite the operational variable with a value obtained according to modular multiplication of the value stored in the operational variable by the Montgomery transform value of the value 1 and (ii) when the value of the obtained digit is judged to be a value other than 0, to overwrite the operational variable with a value obtained according to modular multiplication of the value stored in the operational variable by a value determined by the input value, a repeat control unit operable to control the extraction unit, the squaring unit, the judgment unit and the multiplication unit to repeat the acquisition of the value, the modular squarings, the judgment, and the modular multiplications respectively, for every digit of the integer, an output unit operable, when repetition for each digit of the integer has been completed, to output a value according to the value stored in the operational variable.

Figure 4:
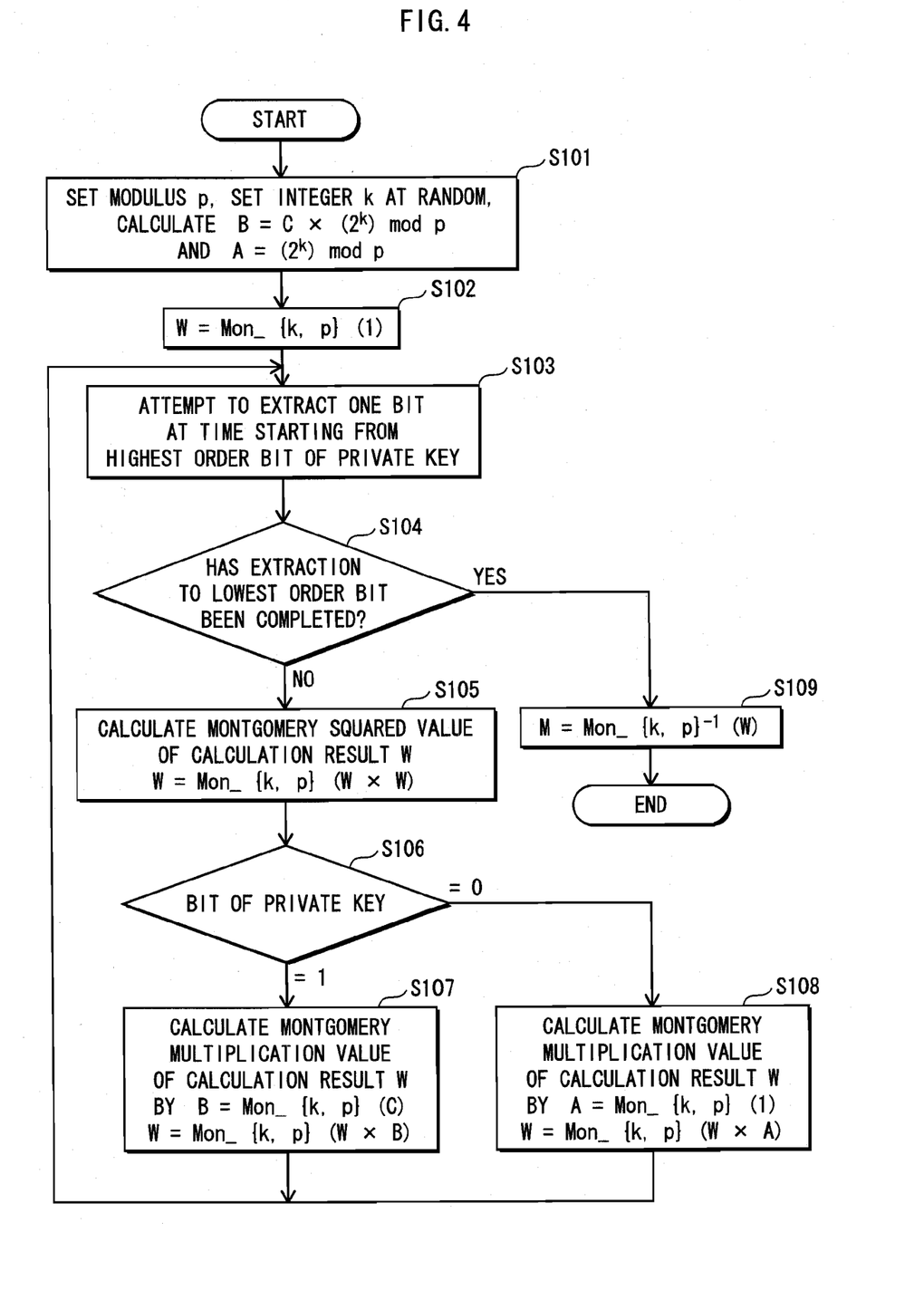
FIG. 4 is a flowchart showing an operation of a high-speed modular exponentiation by the public key decryption unit 101.

The information security apparatus corresponds to an IC card 100 of the embodiment, the acquisition unit to an input/output unit 102, the storage unit to a private key storage unit 113, the initialization unit to Step S102 in FIG. 4, an extraction unit to an extraction unit 122, the squaring unit to a squaring unit 115, the judgment unit to Step S106 in FIG. 4, the multiplication unit to a multiplication unit 116, the repeat control unit to a control unit 114 and the output unit to a Montgomery inverse transform unit 120 and an output unit 102.

According to these structures, it is possible to perform arithmetic calculation from higher or lower order digits.

Here, the information security apparatus may further comprise a Montgomery transform unit operable to calculate the Montgomery transform value of the value 1, wherein the multiplication unit may use the Montgomery transform value calculated by the Montgomery transform unit in performing modular multiplication.

The Montgomery transform unit corresponds to a second Montgomery transform unit 112.

According to the structure, the Montgomery transform unit calculates the Montgomery transform value of the value 1, and the multiplication unit uses the calculated Montgomery transform value. Thus, the calculation of the Montgomery transform value of the value 1 does not have to be performed a plurality of times, reducing the number of the arithmetic calculation.

Here, the information security apparatus may further comprise a modulus setting unit operable to set a first value for the modulus, and an integer setting unit operable to select an integer k which is greater than a number of valid bits of the modulus randomly, wherein the Montgomery transform unit may calculate the Montgomery transform value using the integer k according to the first value for the modulus.

The modulus setting unit corresponds to a modulus setting unit 117 and the integer setting unit to an integer setting unit 118.

According to this structure, since the randomly selected integer k which is greater than the number of valid bits of the modulus is used in calculating the Montgomery transform value, the bias towards hamming weight of "1" can be avoided even more.

Here, the Montgomery transform unit may calculate, as the Montgomery transform value, a value 2 to a k-th power over the modulus.

According to this structure, the Montgomery transform value can be calculated dependently.

Here, the Montgomery transform unit may calculate, as the Montgomery transform value, a value 2 to a k-th power over the first value multiplied by a random number as the modulus.

According to this structure, it is possible to calculate the Montgomery transform value that can avoid the bias towards the hamming weight of "1" even more.

Here, according to the information security apparatus, the modulus setting unit may further set a second value, which is obtained by multiplying the first value by the random number, for the modulus, and the Montgomery transform unit may calculate the value 2 to the k-th power over the second value, which has been further set by the modulus setting unit, as the modulus.

According to this structure, it is possible to calculate the Montgomery transform value that can avoid the bias towards the hamming weight of "1" even more.

Here, the integer setting unit may randomly change the value of the integer k at every acquisition of an input value.

According to this structure, it is possible to make it hard to use the SPA result using a first input value, for another input value.

Here, the modulus setting unit may randomly change, at every acquisition of an input value, the first value for the modulus to be used in the Montgomery transform unit.

According to this structure, it is possible to make it hard to use the SPA result using the first input value, for another input value.

Here, the integer setting unit may randomly change the value of the integer k part way through the repetition.

According to this structure, it is possible to make it hard to use the SPA result in the process of the repetition, for another processing of the repetition.

Here, the modulus setting unit may randomly change the first value for the modulus to be used in the Montgomery transform unit part way through the repetition.

According to this structure, it is possible to make it hard to use the SPA result in the process of the repetition, for another processing of the repetition.

Here, the integer setting unit may randomly change the value of the integer k according to an instruction from outside.

According to this structure, it is possible to make it hard to use the SPA result obtained before being instructed from outside, after the instruction from outside.

Here, the modulus setting unit may randomly change the first value for the modulus to be used in the Montgomery transform unit according to an instruction from outside.

According to this structure, it is possible to make it hard to use the RSA result obtained before being instructed from outside, after the instruction from outside.

Here, the information security apparatus may further comprise a Montgomery transform unit operable to calculate the Montgomery transform value of the input value, wherein the multiplication unit, when the value of the obtained digit is judged to be a value other than 0, may perform the modular multiplication using the Montgomery transform value calculated by the Montgomery transform unit.

The Montgomery transform unit corresponds to a first Montgomery unit 111.

According to this structure, it is possible to make it hard to analyze illegitimately even when the value of the obtained digit is judged to be a value other than 0, countering the SPA.

Here, the information security apparatus may further comprise a modulus setting unit operable to set a first value for the modulus, and an integer setting unit operable to select an integer k which is greater than a number of valid bits of the modulus randomly, wherein the Montgomery transform unit may calculate the Montgomery transform value using the integer k according to the first value for the modulus.

The modulus setting unit corresponds to a modulus setting unit 117 and the integer setting unit to an integer setting unit 118.

According to this structure, since the randomly selected integer k which is greater than the number of valid bits of the modulus is used in calculating the Montgomery transform value, the bias towards the hamming weight of the input value can be avoided.

Here, the Montgomery transform unit may calculate a value 2 to the k-th power over the modulus and sets, as the Montgomery transform value, a value obtained by multiplying the input value by the calculated value.

According to this structure, the Montgomery transform value can be calculated reliably.

Here, the Montgomery transform unit may calculate, as the Montgomery transform value, a value 2 to the k-th power over the first value multiplied by the random number as the modulus.

According to this structure, it is possible to calculate the Montgomery transform value that can avoid the bias towards the hamming weight of the input value even more.

| Descriptions of References | |
|---|---|
| 1 | content playback system |
| 10 | network |
| 100 | IC card |
| 101 | public key decryption unit |
| 102 | input/output unit |
| 111 | first Montgomery transform unit |
| 112 | second Montgomery transform unit |
| 113 | private key storage unit |
| 114 | control unit |
| 115 | squaring unit |
| 116 | multiplication unit |
| 117 | modulus setting unit |
| 118 | integer setting unit |
| 119 | setting control unit |
| 120 | Montgomery inverse transform unit |
| 200 | DVD player |
| 201 | monitor |
| 202 | speaker |
| 211 | communication unit |
| 212 | input/output unit |
| 213 | decryption unit |
| 214 | decryption unit |
| 215 | playback unit |
| 216 | drive unit |
| 300 | DVD |
| 400 | server apparatus |

DETAILED DESCRIPTION OF THE INVENTION

A content playback system 1 is described as one embodiment pertaining to the present invention in the following.

1. Structure of the Content Playback System 1

Figure 1:
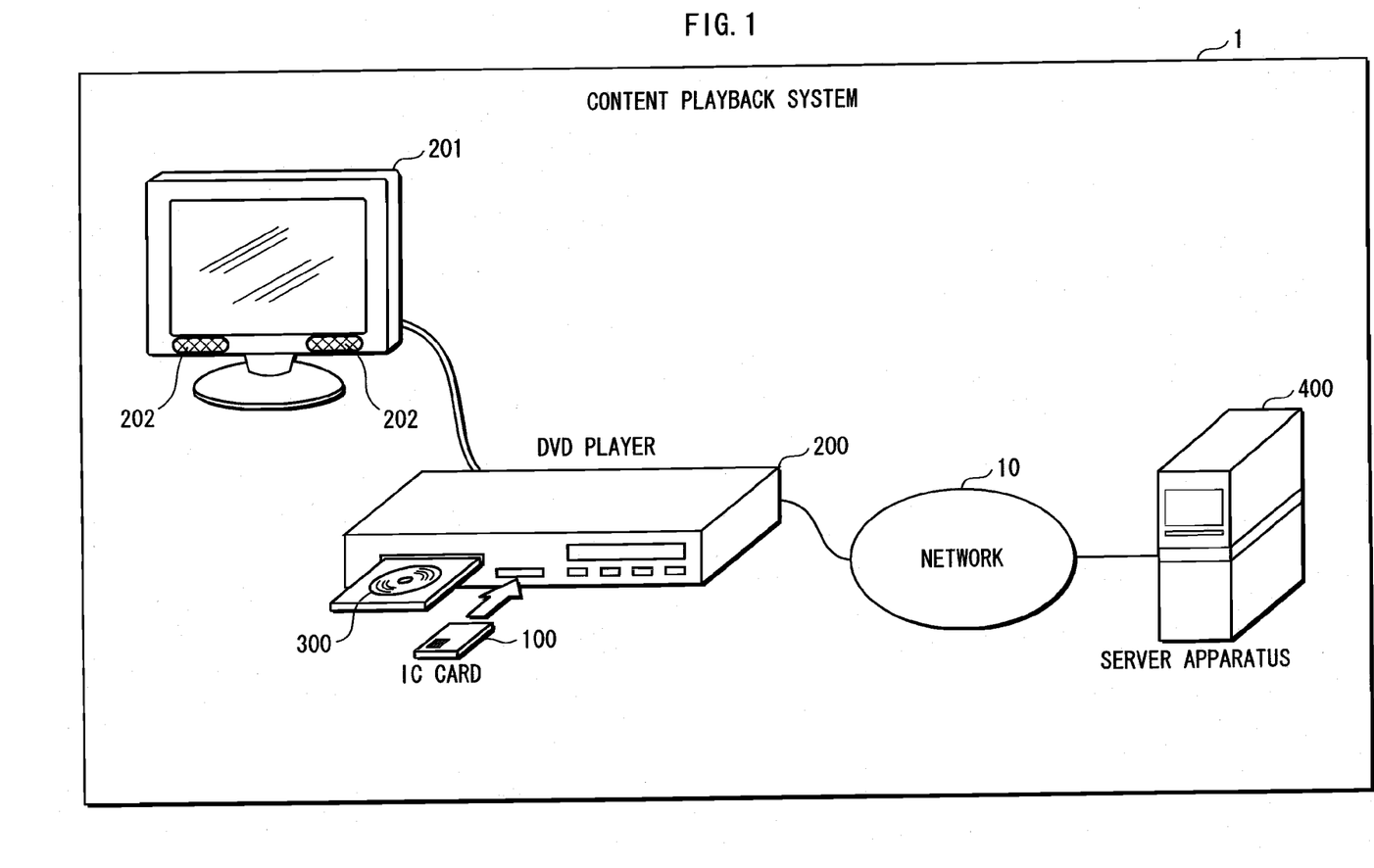
FIG. 1 is a system illustration showing a structure of a content playback system 1 of one embodiment pertaining to the present invention.

The content playback system 1 is composed, as shown in FIG. 1, of an IC card 100, a DVD player 200 and a server device 400. The DVD player 200 and the server device 400 are connected to each other via a network 10.

Figure 2:
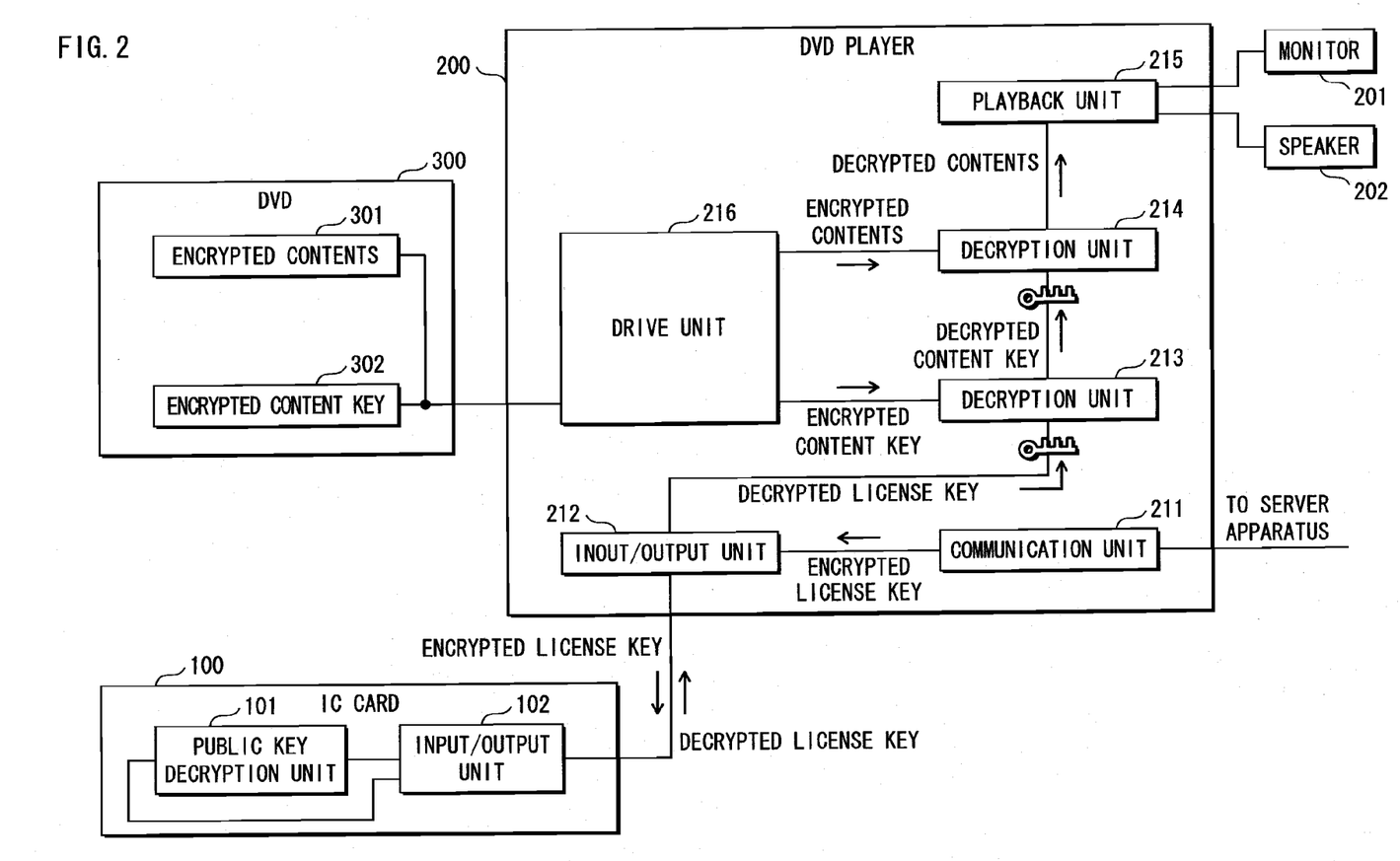
FIG. 2 is a block diagram showing a structure of an IC card 100 and a DVD player 200.

A DVD 300 is mounted in the DVD player 200 by a user. The DVD 300, as shown in FIG. 2, stores encrypted contents 301 and an encrypted content key 302. The encrypted contents 301 are generated by implementing AES (Advanced Encryption Standard) encryption algorithm with respect to contents composed of video and audio, using a content key. The encrypted content key 302 is generated by implementing AES encryption algorithm with respect to the content key, using a license key L showing permission to use the contents.

The server device 400 generates an encrypted license key C, according to a request made by the DVD player 200, by implementing the AES encryption algorithm with respect to the license key L using a public key (e, p) of the user of the IC card 100.

$$C=L^e \bmod p$$

Here, generation of the RSA public key is well-known. Therefore, the description is omitted.

Next, the server device 400 transmits the generated encrypted license key C to the DVD player 200, according to the request made by the DVD player 200, via the network 10.

The DVD player 200 is composed, as shown in FIG. 2, of a communication unit 211, an input/output unit 212, a decryption unit 213, a decryption unit 214, a playback unit 215 and a drive unit 216. A monitor 201 and a speaker 202 are connected to the DVD player 200.

The communication unit 211 in the DVD player 200 receives the encrypted license key C from the server apparatus 400 via the network 10. The IC card 100 is mounted in the DVD player 200 by the user. The input/output unit 212 in the DVD player 200 outputs the received encrypted license key C to the IC card 100.

The IC card 100 is composed of the public key decryption unit 101 and the input/output unit 102. The input/output unit 102 in the IC card 100 receives the encrypted license key C from the DVD player 200. The public key decryption unit 101 decrypts the encrypted license key received as an input data in a manner that is described later, and generates a decrypted license key as an output data. The input/output unit 102 outputs the generated decrypted license key to the DVD player 200.

The input/output unit 212 in the DVD player 200 receives the decrypted license key from the IC card 100. The drive unit 216 reads the encrypted contents 301 and the encrypted content key 302 from the DVD 300. The decryption unit 213, using the received decrypted license key, decrypts the encrypted content key to generate the encrypted content key 302. The decryption unit 214, using the generated decrypted content key, decrypts the encrypted content key 301 to generate decrypted contents. The playback unit 215 regenerates the decrypted contents to generate video and audio signals. Then, the playback unit 215 outputs the generated video signal to the monitor 201 and outputs the generated audio signal to the speaker 202.

Here, the IC card 100 and the DVD player 200 are computer systems that are composed, specifically, of microprocessors, ROM, RAM and the like. A computer program is stored in the RAM. The microprocessors operate in accordance with the computer program, which causes respective devices to function.

Also, in FIG. 2, blocks showing respective components of the DVD player 200 are connected to other blocks by connection wires. However, some of connection wires are omitted. Here, the connection wires indicate paths where signals and information are conveyed. Also, of a plurality of connection wires connected to the block indicating the decryption unit 213, those with key symbols drawn on the connected lines indicate channels where information as a key is communicated to the decryption unit 213. This also applies to the block indicating the decryption unit 214.

Here, the IC card 100 is an information security apparatus that performs secure processing of the input value by the modular exponentiation that raises the input value to the power of an integer.

2. Structure of the Public Key Decryption Unit 101

Figure 3:
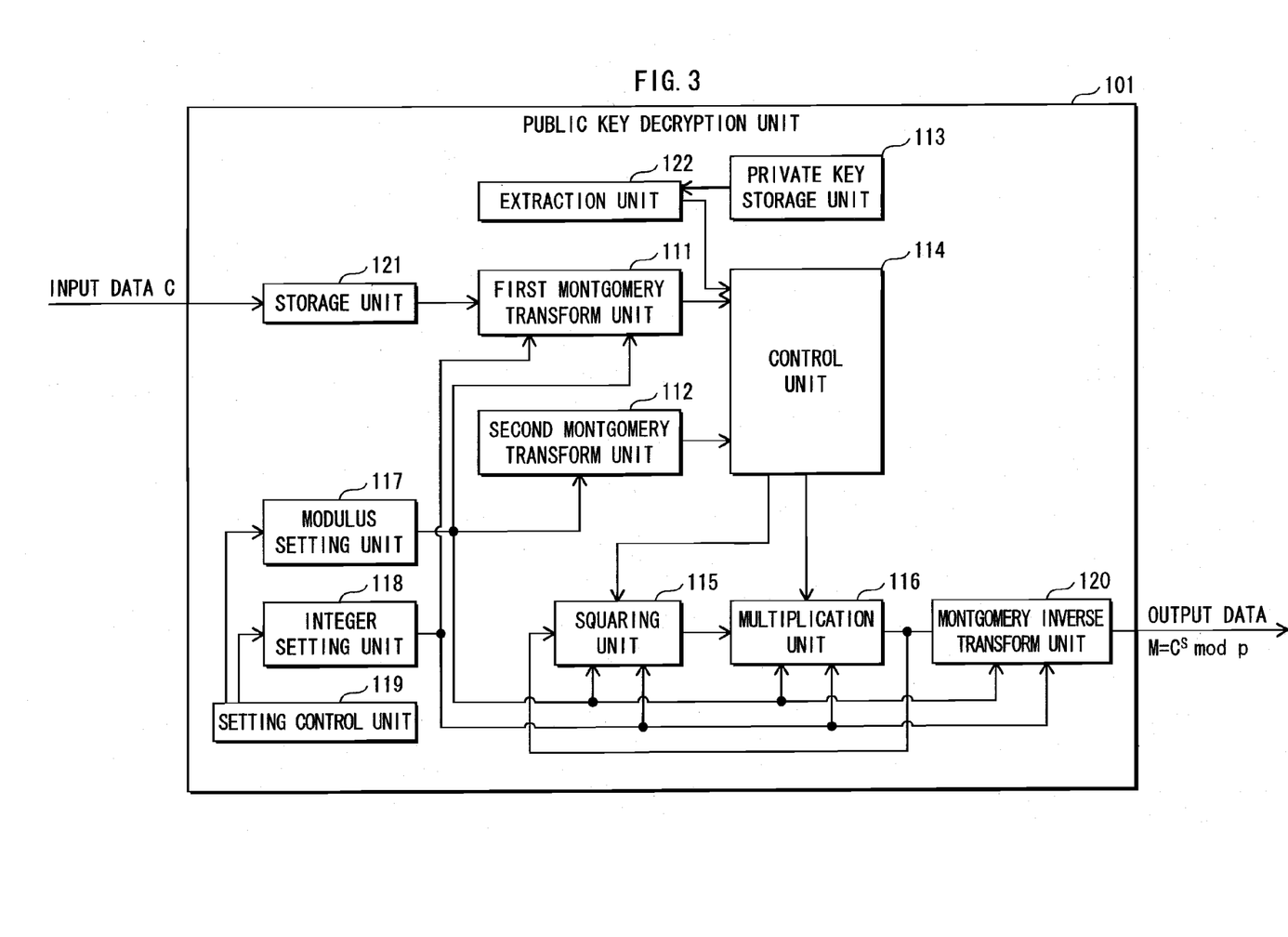
FIG. 3 is a block diagram showing a structure of a public key decryption unit 101.

The public key decryption unit 101 is composed, as shown in FIG. 3, of a storage unit 121, a first Montgomery transform unit 111, a second Montgomery transform unit 112, a private key storage unit 113, a control unit 114, a squaring unit 115, a multiplication unit 116, a modular setting unit 117, a integer setting unit 118, a setting control unit 119 and a Montgomery inverse transform unit 120.

The public key decryption unit 101 stores a private key S and a modulus p inside. The public key decryption unit 101 performs the public key cryptographic calculation with the input data C being an input and then outputs output data $M=C^s \bmod p$ resulting from the calculation. Here, the output data M is a modular exponentiation value of an input value C with a private key S being an exponent of C and p being the modulus of C. Mod p means calculating a remainder when dividing by p. Here, in the embodiment, the public key cryptographic calculation is decryption processing of the RSA cryptosystem. Therefore, the input data and output data correspond to a ciphertext C and decryption text M respectively. Specifically, the input data and output data are the above encrypted license key and the above decrypted license key respectively.

The public key decryption unit 101 performs a high-speed exponential operation that repeats squarings and multiplications staring from the highest order bit of the private key S bit by bit in the Montgomery domain over the set modulus. Overall operation of the public key decryption unit 101 is described later.

(1) The Modulus Setting Unit 117, the Integer Setting Unit 118 and the Setting Control Unit 119

The modulus setting unit 117 sets the modulus p which is used for the Montgomery transform, squaring and multiplication under the control of the setting control unit 119. The modulus setting unit 117 outputs the set modulus p to the first Montgomery transform unit 111, the second Montgomery transform unit 112, the squaring unit 115, the multiplication unit 116 and the Montgomery inverse transform unit 120.

The integer setting unit 118 randomly sets, under the control of the setting control unit 119, an integer k which is greater than the number of bits of p. Here, "the number of bits" of p here is, of p, a bit length from the highest bit position to the lowest bit position to which a value "1" is set. "The number of bits" of p means a so-called "number of valid bits". The integer setting unit 118 outputs the integer k to the first Montgomery transform unit 111, the second Montgomery transform unit 112, the squaring unit 115, the multiplication unit 116 and the Montgomery inverse transform unit 120.

The setting control unit 119 controls the integer setting unit 118 to control a setting range of the integer k and the timing of the setting change. As an example of the timing of the setting change, the setting control unit 119 may change the timing of the setting change every time the value of the input data C changes, or part way through the arithmetic calculation of the input data C.

The integer k and the modulus p set here are used for the Montgomery transform, squaring, multiplication and Montgomery inverse transform later.

(2) The Storage Unit 121, the First Montgomery Transform Unit 111 and the Second Montgomery Transform Unit 112

The storage unit 121 receives the input data C from the input/output unit 102 and stores the received input data C.

The first Montgomery transform unit 111 reads the input data C from the storage unit 121 and receives the modulus p and the integer k from the modulus setting unit 117 and from the integer setting unit 118 respectively. Next, the first Montgomery transform unit 111 calculates a Montgomery transform value B of C using the input data C, the modulus p and the integer k, applying the following formula.

Montgomery transform value $B=C\times(2^k) \bmod p$

Next, the first Montgomery transform unit 111 outputs the calculated Montgomery transform value B to the control unit 114.

Also, the second Montgomery transform unit 112 receives the modulus p and the integer k from the modulus setting unit 117 and the integer setting unit 118 respectively. Next, the second Montgomery transform unit 112 calculates a Montgomery transform value A of "1" using the modulus p and the integer k, applying the following formula.

Montgomery transform value $A=(2^k) \bmod p$

Next, the second Montgomery transform unit 112 outputs the calculated Montgomery transform value A to the control unit 114.

Here, the Montgomery transform is expressed as Mon_{k, p} (X) in the following.

$Mon\_\{k,p\}(X)=X\times 2^k \bmod p$ (formula 1)

Also, a transform function {k, p} shows that the Montgomery transform value depends on the integer k and the modulus p. When this expression is used, the Montgomery transform value B and the Montgomery transform value A that are outputted by the first Montgomery transformation unit 111 and the second Montgomery transformation unit 112 respectively, are Mon_{k, p} (C) and Mon_{k, p} (1) respectively.

(3) The Private Key Storage Unit 113

The private key S of the public cryptosystem is stored in the private key storage unit 113. For the private key S, at least 2048 bits are required for security.

(4) The Extract Ion Unit 112, the Control Unit 114, the Squaring Unit 115 and the Multiplication Unit 116

The extraction unit 122 extracts one bit at a time of the private key S stored in the private key storage unit 113 starting from the higher order bits and outputs the extracted bit value to the control unit 114.

The control unit 114 repeats the squaring and multiplication processing of one bit from the higher order bits of the private key S. For example, the squaring and multiplication processing is performed 2048 times if the private key is 2048 bits. When the repetition has been completed, the Montgomery inverse transform unit 120 performs the Montgomery inverse transform on the calculation result. Then the public key decryption unit 101 outputs $M=C^s \bmod p$.

The control unit 114, along with the above repetition control, selects the output value of the first Montgomery transform unit 111 when the bit of the private key is "1", and the output value of the second Montgomery transform unit 112 when the bit of the private key is "0".

The squaring unit 115 and the multiplication unit 116 execute squarings and multiplications respectively in the Montgomery domain.

Here, the multiplication in the Montgomery domain performs the Montgomery reduction processing on two input values that are transformed into the Montgomery domain (e.g. products of Mon_{k, p} (X) and Mon_{k, p} (Y)) to obtain the calculation result of the Montgomery domain Mon_{k, p} (Z)=Mon_{k, p} (X×Y). The squaring corresponds to the case where the above X and the above Y are same.

Here, the Montgomery reduction is a method to implement the arithmetic calculation of $U\times(2^k)^{-1} \bmod p$ on a precision value U (X×Y in the above) at high speed omitting a division. Details of the Montgomery reduction are described, for example, in Non-Patent Document 3.

Here, if the number of bits of modulus p is 2048, implementing the squaring unit 115 and the multiplication unit 116 with the multiplier of 2048 bits is not practical since the size of the implementation becomes huge. Therefore, it is common to realize with a multi-precision arithmetic calculation method that repeatedly uses the multiplier of 32 bits, for instance.

(5) The Montgomery Inverse Transform Unit 120

The Montgomery inverse transform unit 120 performs the Montgomery inverse transform on the final result of the repeated squarings and multiplications in the Montgomery domain to obtain an output data M. In the following, the Montgomery inverse transform is expressed as:

$Mon\_\{k,p\}^{-1}()$.

$Mon\_\{k,p\}^{-1}(X)=X\times(2^k)^{-1} \bmod p$ (formula 2)

Here, for the Montgomery transform and the Montgomery inverse transform, formula 3 holds.

$Mon\_\{k,p\}^{-1}(Mon\_\{k,p\}(X))=X$ (formula 3)

The Montgomery inverse transform unit 120 outputs the output data M to the input/output unit 102.

3. Operation of the Public Key Decryption Unit 101

The operation of the high-speed modular exponentiation by the public key decryption unit 101 is described using a flowchart shown in FIG. 4.

The modulus setting unit 117 and the integer setting unit 118 determine the modulus p and the integer k respectively. The first Montgomery transform unit 111 calculates the Montgomery transform value $B=C\times(2^k) \bmod p$, and the second Montgomery transform unit 112 calculates the Montgomery transform value $A=C(2^k) \bmod p$ (Step S101).

The control unit 114 selects the Montgomery transform value A calculated by the second Montgomery transform unit 112, and writes the calculation result W as a variable, which is established in operational domain, storing the value of the calculation result, with the Montgomery value A selected as an initial value.

$W=Mon\_\{k,p\}(1)=(2^k) \bmod p$ (Step S102)

The control unit 114 uses the extraction unit 122 to attempt to extract one bit at a time from the highest order bit of the private key S stored in the private key storage unit 113 (Step S103).

On the completion of the extraction from the highest bit position to the lowest bit position of the private key S (Step S104 YES), the control unit 114 controls the Montgomery inverse transform unit 120 to perform the Montgomery inverse transform on the calculation result W. Then the Montgomery inverse transform unit 120 performs the Montgomery inverse transform on the calculation result W to generate the output data M.

$M=Mon\_\{k,p\}^{-1}(W)$

Next, the Montgomery inverse transform unit 120 outputs the output data M to the input/output unit 102. Here, $M=C^s \bmod p$ (Step S109). This is how the high-speed modular exponentiation by the public key decryption unit 101 is completed.

When the extraction has not been completed (NO at Step S104), the control unit 114 controls the squaring unit 115 to raise the calculation result W to the second power in the Montgomery domain. Then the squaring unit 115 raises the calculation result W to the second power in the Montgomery domain and overwrites the calculation result W with the resultant squared value.

$$W = Mon\_\{k,p\}(W \times W) \quad \text{(Step S105)}$$

Next, the control unit 114 judges whether the extracted bit is "1" or "0". If the bit extracted from the private key S is "1"(Step S106), the control unit 114 selects the Montgomery transform value B outputted by the first Montgomery transform unit 111 and controls the multiplication unit 116 to calculate the Montgomery multiplication. The multiplication unit 116 multiplies the calculation result W by the Montgomery transform value B=Mon_{k, p} (c) outputted by the first Montgomery transform unit 111. Then the multiplication unit 116 overwrites the calculation result W with the obtained value.

W=Mon_{k, p} (W×B) (Step S107). Next, the control unit 114 shifts the control to step S103.

On the other hand, when the bit extracted from the private key S is "0", the control unit 114 selects the output value of the second Montgomery transform unit 112 and controls the multiplication unit 116 to perform the Montgomery multiplication. Then the multiplication unit 116 multiplies the calculation result W by the output value of the second Montgomery transform unit 112 (A=Mon_{k, p} (1) and then overwrites the calculation result W with the obtained value.

W=Mon_{k, p} (W×A) (Step S108). Next, the control unit 114 shifts the control to the Step S103.

3. Effect of the Embodiment

First of all, as evident form the flowchart in FIG. 4, regardless of whether the bit of the private key S is "1" or "0", the Montgomery multiplication unit 116 never fails to operate. Therefore, the SPA, which attacks that analyzes by whether the multiplication is performed or not, is difficult.

In the embodiment, "1" in the Montgomery domain (expressed as Mon {k, p} (1)) is used for the multiplication where the bit of the private key is "0". Here, the "1" in the Montgomery domain is a value that is determined depending on the integer k and the modulus p. Therefore, attackers who do not know k or p cannot predict the hamming weight. So, it is hard to distinguish "1" in the Montgomery domain to analyze.

Also, if the hamming weight should be obtained by an attacker, the analysis that distinguishes "1" in the Montgomery domain might succeed. In the embodiment, furthermore, the hamming weight is changed, by changing the integer k at random under a restriction that the integer k should be greater than the number of bits of the modulus p, which makes it even harder to analyze.

Here, as the timing of the change gets more frequent, and moreover, a variety of numbers that the integer k can take increases, it becomes harder to distinguish a dummy multiplication. Thus, the security increases. However, increasing the variety of numbers from which the integer k can take too much generally causes the processing time for one squaring and multiplication to increase. Therefore, how much variety of numbers from which the integer k can take or how the timing of the change is set are determined depending on the speed and safety required for the application. Here, the setting control unit 119 in FIG. 3 performs these controls.

4. Other Modifications

Although the present invention is described based on the above embodiment, it is readily apparent that the present invention is not limited to the above embodiment. The present invention also includes the following cases.

Figure 5:
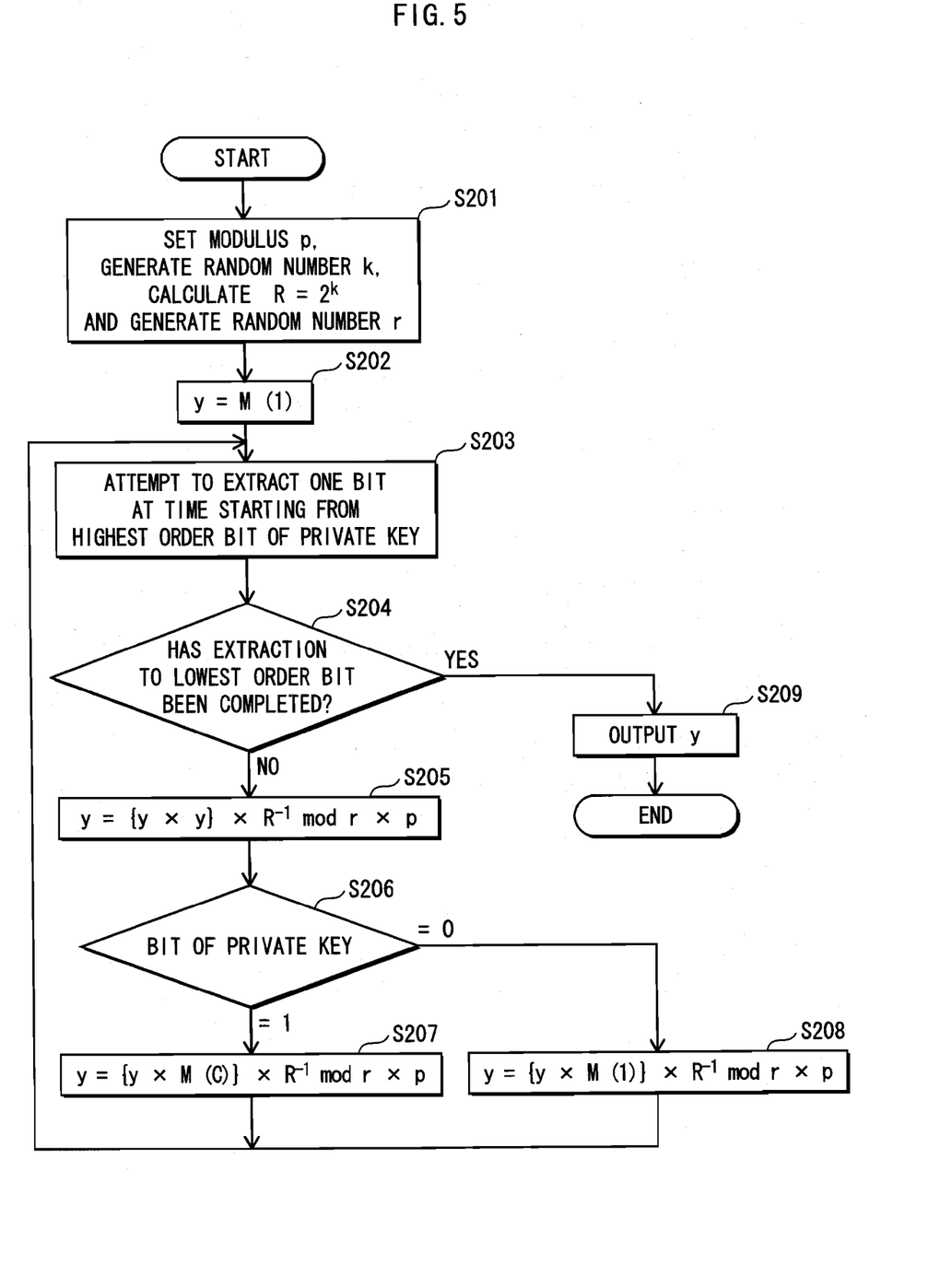
FIG. 5 is a flowchart showing an operation of another high-speed modular exponentiation by the public key decryption unit 101.

(1) The operation of the high-speed modular exponentiation that is different from the above modular exponentiation by the public key decryption unit 101 is described using the flowchart shown in FIG. 5.

The modulus setting unit 117 determines the modulus p. Here, the modulus p, for example, is a secret prime number of 512 bits. Also, the modulus setting unit 117 determines a value R which is 2 raised to the power of a random exponent, the value R being greater than p. For example, a random number k is generated, and R=$2^k$. For example, R=$2^{512}$. Also, the modulus setting unit 117 generates a random number r (Step S201).

Next, the second Montgomery transform unit 112 calculates a Montgomery transform value y.

$$y = M(1) = R \bmod p = R - p$$

y is a variable provided in the operational domain for storing the value of the calculation result.

Here, "Mod_{k, p} (1)" is expressed more briefly as "M (1)" (Step S202).

The control unit 114 uses the extraction unit 122 to attempt to extract one bit at a time from the highest bit order of the private key S stored in the private key storage unit 113 (Step S203).

When the extraction from the highest bit position to the lowest bit position of the private key S has been completed (S204: YES), y is extracted (S209) and the high-speed modular exponentiation by the public key decryption unit 101 completes.

When the extraction has not been completed (Step S204: NO), the squaring unit 115 performs the squaring using the following formula.

$$y = \{y \times y\} \times R^{-1} \bmod r \times p \quad \text{(Step S205)}.$$

Next, the control unit 114 judges whether the extracted bit is "1" or "0". When the bit extracted from the private key is "1" (Step S206), the multiplication unit 116 performs the multiplication using the following formula.

$$y = \{y \times M(C)\} \times R^{-1} \bmod r \times p \quad \text{(Step S207)}$$

Next, the control unit 114 shifts the control to Step S103.

On the other hand, when the bit extracted form the private key S is "0", the multiplication unit 116 performs the multiplication using the following formula.

$$y = \{y \times M(1)\} \times R^{-1} \bmod r \times p \quad \text{(Step S208)}$$

Next, the control unit 114 shifts the control to Step 103.

In this modification, the public key decryption unit 101 does not include the Montgomery inverse transform unit 120.

(2) The timing of changing the integer k may be at every acquisition of input data. That is, when the first input data is obtained, the value of the integer k is changed randomly. When the second input data is obtained, the value of the integer k is changed randomly again. When the third input data is obtained, the value of the integer k is changed randomly again.

Also, the same k may be used for the plurality of input data. Another same integer may be used for the next plurality of input data Also, the integer k may be changed randomly part way through calculating some input data (part way through the repetition). Furthermore, the integer k may be changed randomly with the timing that the application and the user instruct from outside.

For the modulus used in the first and second Montgomery transform unit; the modulus may be changed at every acquisition of the input data like the above, the same modulus may be used for a plurality of the input data, another same integer may be used for the next plurality of input data, the modulus may be changed randomly part way through calculating the input data (part way through the repetition) or the modulus may be changed with the timing that the application and the user instruct from outside.

(3) (a) The output of the second Montgomery transform unit 112 may be obtained using the p multiplied by a random number as a modulus.

That is, the modulus setting unit 117 generates a random number r and outputs the generated random number r to the second Montgomery transform unit 112. The second Montgomery transform unit 112 outputs $2^k$ mod (r×p).

Thus, it is even harder to distinguish whether the first Montgomery transform unit 111 or the second Montgomery transform 112 is used, which increases the security.

At this time, the modulus of the second Montgomery transform unit 112 may remain as p or may be p multiplied by another random number.

Thus, p may be set independently for the modulus of the first Montgomery transform unit 111 and the modulus of the second Montgomery transform unit 112.

Here, the modulus of the Montgomery inverse transform unit 120 remains as p.

(b) Also, the modulus used for the first Montgomery transform unit 111 may be p multiplied by the random number. At this time, the modulus of the second Montgomery transform unit 112 may remain as p or may be p multiplied by another random number. Also, the modulus of the Montgomery inverse transform unit 120 remains as p. Thus, the security increases against the attack calculating the correlation among the power variations in a plurality of areas during the calculation of a piece of the input data.

Also, after p multiplied by the random number has been obtained as a new modulus first, the calculations in the first Montgomery transform unit 111, the second Montgomery transform unit 112, the squaring unit 115 and the multiplication unit 116 may be performed using the new modulus. However, in this case, in order to obtain the original end output of the predetermined modulus, it is necessary to output after having performed a remainder operation over the modulus p.

(c) According to the above (a) and (b), when the modulus of p multiplied by the random number (a first modulus) and the modulus of p multiplied by another random number are used in the first Montgomery transform unit 111 and in the second Montgomery transform unit 112 respectively, in other words, when the first modulus and the second modulus are different, the modulus used in the squaring unit 115 and the multiplication unit 116 is a common multiple of the first modulus and the second modulus. Then the modulus used in the Montgomery inverse transform unit 120 may remain as p.

(4) The value of the Montgomery domain may be input data or output data. In this case, the first Montgomery transform unit 111 and the Montgomery inverse transform unit 120 included in the embodiment may be implemented outside the public key decryption unit 101. This is the case, for example, where the public key decryption unit 101 is implemented as a part of a big system and not only the arithmetic calculation but also all other operations are implemented in the Montgomery domain.

(5) In the embodiment, although the high-speed binary modular exponentiation that processes the private key bit by bit is used, the present invention is not limited to the processing of bit by bit.

For example, in the case of processing every two bits, the squaring is performed twice in the squaring unit 115. The control unit 114 selects output values from four types of the Montgomery transform units corresponding to the two bits of the private key. Then the multiplication unit 116 multiplies the selected output values.

Here, one of four types of the Montgomery transform unit becomes the Montgomery transform unit of "1" (i.e. a unit that obtains the input value of the dummy multiplication) and is selected when both of the two bits of the private key are "0".

Here, when two bits are "00", the corresponding Montgomery transform unit outputs the Montgomery transform value of "1" and when the two bits are "01", the corresponding Montgomery transform unit outputs the Montgomery transform of "C". Also, when two bits are "10", the corresponding Montgomery transform unit outputs the Montgomery transform value of "$C^2$" and when two bits are "11", the corresponding Montgomery transformation unit outputs the Montgomery transformation value of "$C^3$".

Naturally, processing the private key more than every three bits can be realized by expanding and applying the above.

Furthermore, in the embodiment, the algorithm that processes the private key from the higher position is used, but the algorithm that processes the private key from the lower position is possible. In this case, the Montgomery transform value corresponding to the input data is squared repeatedly. When the bit corresponding to the private key is 1, the squared value is multiplied. When the bit is 0, the dummy multiplication using the value obtained from the integer k and the modulus p, like the embodiment, is performed.

Figure 6:
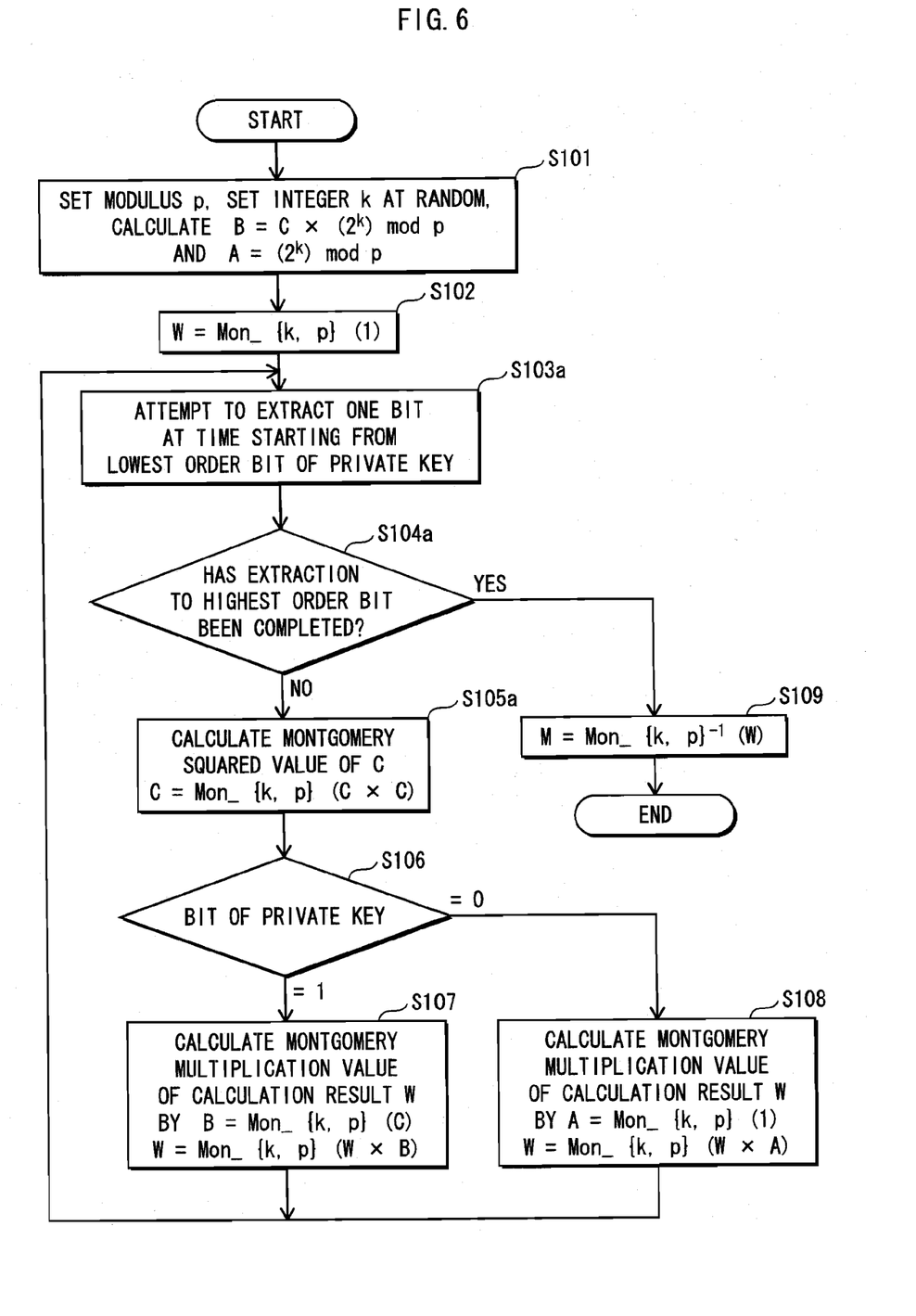
FIG. 6 is a flowchart showing an operation of the high-speed modular exponentiation by the public key decryption unit 101 when a processing is performed from the lower order bits of the private key.

The operation of the high-speed modular exponentiation by the public key decryption unit 102 of this case is described using a flowchart shown in FIG. 6, focusing on differences from FIG. 4.

Instead of the Step S103 shown in FIG. 4, in Step S103a, the control unit 114 has the extraction unit 122 attempt to extract the private key S stored in the secret key storage unit 113 bit by bit from the lowest bit position.

When the extraction from the lowest bit position to the highest bit position of the private key S has been completed (Step S104a: YES), the control unit 114 controls the Montgomery inverse transform unit 120 to perform the Montgomery inverse transform on the calculation result W.

When the extraction has not been completed (Step S104a: NO), instead of Step S105 shown in FIG. 4, in the Step S105a, the control unit 114 controls the squaring unit 115 to raise the input data C to the second power in the Montgomery domain. Then the squaring unit 115 raises the input data C to the second power in the Montgomery domain and overwrites the input data C with the squared value.

$$C=Mon\_\{k,p\}(C\times C)$$

(6) In the embodiment, the public key decryption unit 101 is described in the decryption processing of the RSA encryption, but the public key decryption unit 101 may be applied to the signature generation of the RSA signature, as shown in the following.

The public key decryption unit 101 performs the key generation of the RSA. The key generation of the RSA is performed in the same manner as the RSA cryptosystem. Therefore, the detail description of the key generation of RSA is omitted.

Here, the private key is d and the public keys are e and p.

A signature generation device generates signature data S for a text m, using the following formula.

$$S=h(m)^d \bmod p$$

Here, h( ) is a one-way hash function.

The present invention is applied to the signature generation device in the same way as the above embodiment. The signature generation device is an information security apparatus that performs reliable processing of an input value by performing the modular exponentiation that raises the input value to the power of the integer over a predetermined modulus.

Also, a signature verification device verifies the signature applying the following formula.

$$h(m) = s^e \bmod p$$

Also, the present invention can be applied to an application that keeps public keys secret in the encryption processing of the RSA cryptosystem.

Furthermore, the present invention can be used as the countermeasure of the SPA on an elliptic curve cryptosystem and a hyper-elliptic curve cryptosystem in processing using the secret key.

(7) The above embodiment and the modifications are applied in the following cases.

(a) The above embodiment and the modifications are applied in sending a secret message.

In the embodiment, the description is given of the case where the license key is sent secretly as an example of sending the secret message.

As mentioned above, the IC card 100 is an information security apparatus that performs secure processing of the input value by performing modular exponentiation that raises the input value to the power of the integer over a predetermined modulus. Here, "secure" means keeping the message secret from a third party other than a sender and a receiver.

The present invention is applied to a content distribution system that is composed of a content encryption device and a content playback device. Secret communication objects may be, for example, digital information such as a movie, motion picture, audio, music, novel, database and the like. These contents are provided by selling and renting a recording medium, which records the contents, to a user by a content provider. Also, these contents are provided by the content provider to the user via a digital broadcast and the internet.

The content encryption device, which is owned by the content provider, encrypts the movie which is a digital work and records the encrypted movie to a DVD. The content playback device, which is owned by the user, reads out and decrypts the encrypted digital work from the DVD and then generates the movie. Then the content playback device plays back, displays and outputs the generated movie as audio and video.

In the above example, the content key for encrypting and decrypting the contents may be the secret communication object shown in the embodiment. In this case, the content key is encrypted and decrypted in the same way as the method shown in the embodiment.

In this case, the contents are encrypted and decrypted by the content key using a shared key encryption method.

The present invention can be applied for a money settlement system shown in the following.

For example, electronic money which can be used instead of currency is the object of the secret communication and the IC card stores the electronic money. When a user purchases a product, the IC card encrypts and transmits the electronic money equivalent to the amount of the product. Also, the transmitted amount is subtracted from the electronic money stored in the IC card. A register device, which is provided in a store, receives the encrypted electronic money, decrypts the received encrypted electronic money, regenerates and stores the decrypted electronic money internally.

Also, instead of the above IC card, an IC card type electronic ticket for an access to various facilities such as an art museum, a museum and the like, may store information equivalent to the electronic money. An admission management device located at the entrance of various facilities may charge the amount of the electronic money equivalent to the access fee to the facilities. Then the electronic ticket may encrypt and transmit the charged amount of the electronic money. The admission management device may receive the encrypted electronic money, decrypt the received encrypted electronic money to generate the electronic money and store the generated electronic money therein.

Also, an IC card type IC card ticket for an access to facilities for travel such as a train, bus and the like may store information equivalent to electronic money like the above. An admission management device located at the entrance of a station of the facilities for travel may transmit distinction information that distinguishes the station and the card ticket receives and stores the distinction information. An exit management device located at the exit of a station of the facilities for travel may receive the distinction information from the IC card ticket. The exit management device calculates a fare referring to a fare list, using the received distinction information and the station where the exit management device is located and then charges the electronic money equivalent to the calculated fare. Then the IC card ticket may encrypt and transmit the charged amount of the electronic money. Then the exit management device receives the encrypted electronic money, decrypts the received electronic money to generate the electronic money and stores the generated electronic money internally.

(b) The embodiment and modifications are applied to a certification. The certification is the verification of the sender, and the authentication of the message. Also, the embodiment and the modifications are applied to an identification of a bearer. The identification of the bearer is, for example, the verification of access rights to data, the verification of access rights to facilities (right to enter) and a proof of being a person that one claims. Furthermore, the embodiment and the modifications are applied to prevention of a denial. The prevention of the denial is, for example, resisting those who insist on not having agreed, even though they have agreed to something.

In the above modification, the RSA digital signature is described as an example of the certification. The present invention is applied to the above signature generation device like the above embodiment. The signature generation device is an information security apparatus that performs reliable processing of the input value by modular exponentiation that raises the input value to the power of the integer.

Here, "reliable" means the verification of the sender, and the authentication of the message. Also, the "reliable" means the verification of access rights to data, the verification of access rights to facilities (right to enter) and a proof of being a person that one claims.

(c) The embodiment and modifications are applied to a key exchange (also called "key sharing"). The key exchange means that, for example, two users agree on a private key for using in a certain private key encryption method, using a broadcasting radio wave.

DH (Diffie-Hellman) key exchange is a typical method of key exchanges. Here, respective users exchanging a shared key generate a secret exponent randomly, and perform exponentiation using the generated exponent.

At this time, the present invention is applied to the exponentiation. Then the users can share the common key by keeping the secret exponent secret.

(d) The embodiment and the modifications are applied to a zero-knowledge proof. The zero-knowledge proof is, for example, that one party convinces another of having succeeded in solving number theoretic or combinatorial theoretic problems, without revealing any information on what the answer is.

(e) As mentioned above, the present invention can be applied to a protocol method that uses an exponentiation using a secret exponent value.

(8) The present invention is an information security apparatus that performs the modular exponentiation, using input data and the private key by repeating multiplications over the predetermined modulus. The information security apparatus includes the first Montgomery transform unit, the second Montgomery transform unit, the control unit and the multiplication unit. Here, the first Montgomery transform unit obtains the Montgomery transform value corresponding to the input data. The second Montgomery transform unit obtains the Montgomery transform value of 1. The control unit selects the output of the second Montgomery transform unit when the bit of the private key is 0 and otherwise selects the output of the first Montgomery transform unit. When the modulus is p and an integer that is greater than the number of valid bits of p is k, the second Montgomery transform unit outputs the exponent value of 2 whose exponent is k, with p being the modulus. According to the information security apparatus, the output of the second Montgomery transform unit (1 in the Montgomery domain) is determined, depending on the integer k and the modulus p. Therefore, there is no bias towards the hamming weight and it is hard to distinguish whether the output of the first Montgomery transform unit or the output of the second Montgomery transform unit is used as the input of the multiplication, using the power variations.

Here, an integer k setting unit that selects the integer k greater than the number of valid bits of the p randomly may be structured to be included. According to this structure, the output of the second Montgomery transform unit changes depending on the integer k which is selected randomly. Therefore, the security against the attack, which calculates the correlation among the power variations using a plurality of the input data, increases.

Here, the second Montgomery transform unit may be structured to output the exponent value of 2 whose exponent is k, with p multiplied by a random number being the modulus. According to this structure, the output of the second Montgomery transform unit changes depending on the value of the randomly selected modulus. Therefore, the security against the attack, which calculates the correlation among the power variations using a plurality of the input data, increases.

Here, the first Montgomery transform unit may be structured to output the Montgomery transform value corresponding to the input data, with the p multiplied by the random number being the modulus. According to this structure, the output of the first Montgomery transform unit changes depending on the change in the modulus. Therefore, the security against the attack, which calculates the correlation among the power variations in a plurality of areas, increases.

Here, a modulus changing unit that sets p multiplied by the random number as a new modulus may be included. Then predetermined calculations may be structured to be processed using the set modulus in the first Montgomery transform unit, the second Montgomery transform unit and the multiplication unit. According to this structure, the modulus, which is used in not only the first Montgomery transform unit and the second Montgomery transform unit but also the multiplication unit, is transformed depending on the modulus changed in the modulus changing unit. Therefore, the correlation among the power variations and the private key gets even smaller, increasing the security.

Here, the integer k and the modulus may be structured to be changed by instructions from outside. According to this structure, by changing the integer k and the modulus with the timing instructed by an application from outside or a user, an information security apparatus having an ability and security corresponding to the timing can be realized.

(9) The above devices are computer systems that are composed, specifically of a microprocessor, ROM, RAM and the like. A computer program is stored in the RAM. Here, the computer program is composed of a combination of a plurality of instruction codes indicating instructions for computers in order to achieve predetermined functions. The microprocessor operates in accordance with the computer program, which causes the devices to function. That is, the microprocessor reads each instruction included in the computer program bit by bit, decrypts the instructions read out and operates in accordance with the decrypted result.

(10) Apart of or whole components constituting the above devices may be composed of one system LSI (Large Scale Integration). The system LSI is a super multi-function LSI produced by accumulating a plurality of structural units in a chip. The system SLI, specifically, is a computer system including a microprocessor, ROM, RAM and the like. A computer program is stored in the RAM. The microprocessor operates in accordance with the computer program, which causes the system LSI to function.

Also, the units of components that constitute the above devices may be made into individual one-chip units or into one chip so as to include a part of or whole units. Also, although the system is called "LSI" here, the LSI may be called "IC", "system LSI", "super LSI" or "ultra SLI", depending on differences in integrated level.

Also, a technique of making integrated circuits is not limited to the technique of the LSI. Therefore, the integrated circuit may be realized by a dedicated circuit or a multipurpose processor. An FPGA (field programmable gate array) capable of being programmed or a configurable processor capable of restructuring the connection and setting of circuit cells after the production of the LSI inside the LSI may be used.

Furthermore, if a technology of creating the integrated circuit that replaces LSI appears due to an advance of semiconductor technology or other deriving technology, naturally, function blocks may be accumulated using the technology. An application of biotechnology and the like are possible.

(11) Apart of or whole components constituting the above devices may be composed of an IC card or single module, the IC card being capable of attaching to and removing from the devices. The IC card and the module are computer systems composed of the microprocessor, ROM, RAM and the like. The IC card and the module may include the above multi-function LSI. The microprocessor operates in accordance with the computer program, which causes the IC card and the module to achieve the function. This IC card and the module may be tamper resistant.

(12) The present invention may be the methods shown in the above. Also, the present invention may be a computer program that realizes these methods by a computer or may be digital signal composed of the computer program.

Also, the present invention may be a computer-readable recording medium such as a flexible disk, a hard disk, a CD-ROM, an MO, a DVD, a DVD ROM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on an electronic communication network, a wireless or wired communication network, a network of which the Internet is representative, or a data broadcast.

Furthermore, present invention may be a computer system that includes a memory and a microprocessor. In this variation, the memory may store the computer program, and the microprocessor may perform operations in accordance with the computer program.

Furthermore, by transferring the program or the digital signal to the recording medium, or by transferring the program or the digital signal via a network or the like, the program or the digital signal may be executed by another independent computer system.

(13) Furthermore, it is possible to provide a combination of any of the embodiments and modifications described above.

INDUSTRIAL APPLICABILITY

The information security apparatus and information security method of the present invention are used for a cryptographic module that realize public key encryption operation and signature operation using a private key when there is a concern about an attack such as SPA and the like where the IC cards and security card especially are fallen into the hands of a cryptanalyst.

The devices that constitute the present invention can be used managerially, continuously and repeatedly for any industry that requires the transmission of a secret message and/or certification. Also, the devices that constitute the present invention can be produced and sold managerially, continuously and repeatedly in electronic machinery production industry.

The invention claimed is:

1. An information security apparatus for processing an input value securely and reliably by operating a modular exponentiation that raises the input value to a power of an integer over a predetermined modulus, the modular exponentiation including repeated multiplications performed on each digit of the integer so as to obtain an exponential value, the information security apparatus comprising:
   a modulus setting unit operable to set a first value for the modulus;
   an integer setting unit operable to randomly select an integer k which is greater than a number of valid bits of the modulus;
   a judgment unit operable to judge whether a value of a digit of the integer is 0 or not;
   a Montgomery transform unit operable to perform a Montgomery transform on a numeral value of 1 using the integer k in accordance with the first value for the modulus so as to calculate a Montgomery transform value; and
   a multiplication unit operable, when the value of the digit is judged to be 0, to operate a modular multiplication using the Montgomery transform value calculated by the Montgomery transform unit.

2. The information security apparatus of claim 1, wherein the Montgomery transform unit calculates, as the Montgomery transform value, a numeral value of 2 to a k-th power over the modulus.

3. The information security apparatus of claim 1, wherein the Montgomery transform unit calculates, as the Montgomery transform value, a numeral value of 2 to a k-th power over the first value multiplied by a random number as the modulus.

4. The information security apparatus of claim 3, wherein the modulus setting unit further sets a second value, which is obtained by multiplying the first value by the random number, for the modulus, and
   wherein the Montgomery transform unit calculates the numeral value of 2 to the k-th power over the second value, which has been set by the modulus setting unit, as the modulus.

5. The information security apparatus of claim 1, wherein the integer setting unit randomly changes a value of the integer k at every acquisition of an input value.

6. The information security apparatus of claim 1, wherein the modulus setting unit randomly changes, at every acquisition of an input value, the first value for the modulus to be used in the Montgomery transform unit.

7. The information security apparatus of claim 1, wherein the integer setting unit randomly changes a value of the integer k part way through the repetition.

8. The information security apparatus of claim 1, wherein the modulus setting unit randomly changes the first value for the modulus to be used in the Montgomery transform unit part way through the repetition.

9. The information security apparatus of claim 1, wherein the integer setting unit randomly changes a value of the integer k according to an instruction from outside.

10. The information security apparatus of claim 1, wherein the modulus setting unit randomly changes the first value for the modulus to be used in the Montgomery transform unit according to an instruction from outside.

11. An information security apparatus for processing an input value securely and reliably by operating a modular exponentiation that raises the input value to a power of an integer over a predetermined modulus, the modular exponentiation including repeated multiplications performed on each digit of the integer so as to obtain an exponential value, the information security apparatus comprising:
   a modulus setting unit operable to set a first value for the modulus;
   an integer setting unit operable to randomly select an integer k which is greater than a number of valid bits of the modulus;
   a judgment unit operable to judge whether a value of a digit of the integer is 0 or not
   a first Montgomery transform unit operable to perform a first Montgomery transform on a numeral value of 1 using the integer k in accordance with the first value for the modulus so as to calculate a first Montgomery transform value;
   a second Montgomery transform unit operable to perform a second Montgomery transform on a numeral value of 1 using the integer k in accordance with the first value for the modulus so as to calculate a second Montgomery transform value; and
   a multiplication unit operable to (i) perform the modular multiplication using the second Montgomery transform value calculated by the second Montgomery transform unit when the value of the digit is judged to be 0 and (ii) perform the modular multiplication using the first Montgomery transform value calculated by the first Montgomery transform unit when the value of the digit is judged to be a value other than 0.

12. The information security apparatus of claim 11, wherein the first Montgomery transform unit (i) calculates a numeral value of 2 to the k-th power over the modulus and (ii) sets, as the first Montgomery transform value, a value obtained by multiplying the input value by the calculated value.

13. The information security apparatus of claim 11, wherein the second Montgomery transform unit calculates, as the second Montgomery transform value, a numeral value of 2 to a k-th power over the first value multiplied by the random number as the modulus.

14. An information security method used for an information security apparatus for processing an input value securely and reliably by operating a modular exponentiation that raises the input value to a power of an integer over a predetermined modulus, the modular exponentiation including repeated multiplications performed on each digit of the integer so as to obtain an exponential value, the information security method comprising:

a modulus setting step of setting a value of the modulus;

an integer setting step of randomly selecting an integer k which is greater than a number of valid bits of the modulus;

a judgment step of judging whether a value of a digit of the integer is 0 or not;

a Montgomery transform step of performing, using a processor, a Montgomery transform on a numeral value of 1 using the integer k in accordance with the set value of the modulus so as to calculate a Montgomery transform value; and a multiplying step of operating, when the value of the digit is judged to be 0, a modular multiplication using the Montgomery transform value calculated by the Montgomery transform unit.

15. A non-transitory computer readable recording medium having stored thereon a computer program for information security used for an information security apparatus for processing an input value securely and reliably by operating a modular exponentiation that raises the input value to a power of an integer over a predetermined modulus, the modular exponentiation including repeated multiplications performed on each digit of the integer so as to obtain an exponential value, wherein, when executed, the computer program causes the information security apparatus to perform a method comprising:

a modulus setting step of setting a value of the modulus;

an integer setting step of randomly selecting an integer k which is greater than a number of valid bits of the modulus;

a judgment step of judging whether a value of a digit of the integer is 0 or not;

a Montgomery transform step of performing a Montgomery transform on a numeral value of 1 using the integer k in accordance with the set value of the modulus so as to calculate a Montgomery transform value by; and a multiplying step of operating, when the value of the digit is judged to be 0, a modular multiplication using the Montgomery transform value calculated by the Montgomery transform unit.

16. An integrated circuit for processing an input value securely and reliably by operating a modular exponentiation that raises the input value to a power of an integer over a predetermined modulus, the modular exponentiation including repeated multiplications performed on each digit of the integer so as to obtain an exponential value, the integrated circuit comprising:

a modulus setting unit operable to set a first value for the modulus;

an integer setting unit operable to randomly select an integer k which is greater than a number of valid bits of the modulus;

a judgment unit operable to judge whether a value of a digit of the integer is 0 or not;

a Montgomery transform unit operable to perform a Montgomery transform on a numeral value of 1 using the integer k in accordance with the first value for the modulus so as to calculate a Montgomery transform value; and a multiplication unit operable, when the value of the digit is judged to be 0, to operate a modular multiplication using the Montgomery transform value calculated by the Montgomery transform unit.

* * * * *